United States Patent
Foo

(10) Patent No.: US 7,688,006 B2
(45) Date of Patent: Mar. 30, 2010

(54) STEPLESS DIMMING FLUORESCENT LAMP AND BALLAST THEREOF

(75) Inventor: Onn Fah Foo, Kowloon (HK)

(73) Assignee: Mass Technology (H.K.) Ltd., Kowloon (HK)

( * ) Notice: Subject to any disclaimer, the term of this patent is extended or adjusted under 35 U.S.C. 154(b) by 127 days.

(21) Appl. No.: 12/039,890

(22) Filed: Feb. 29, 2008

(65) Prior Publication Data

US 2008/0211417 A1 Sep. 4, 2008

(30) Foreign Application Priority Data

Mar. 2, 2007 (CN) .................. 2007 1 0087630

(51) Int. Cl.
*H05B 37/02* (2006.01)
(52) U.S. Cl. .............. 315/307; 315/207; 315/224; 315/DIG. 4
(58) Field of Classification Search .......... 315/194, 315/207–208, 224, 291, 299, 302, 307–308, 315/DIG. 4

See application file for complete search history.

(56) References Cited

U.S. PATENT DOCUMENTS

| 5,872,429 | A | * | 2/1999 | Xia et al. ................. 315/194 |
| 5,982,110 | A | * | 11/1999 | Gradzki .................. 315/247 |
| 7,242,154 | B2 | * | 7/2007 | Rudolph ................. 315/291 |
| 7,285,919 | B2 | * | 10/2007 | Newman et al. .......... 315/224 |
| 7,385,360 | B2 | * | 6/2008 | Dluzniak ................ 315/307 |
| 2008/0094010 | A1 | * | 4/2008 | Black ..................... 315/307 |

* cited by examiner

*Primary Examiner*—David Hung Vu
*Assistant Examiner*—Tung X Le
(74) *Attorney, Agent, or Firm*—Rabin & Berdo, P.C.

(57) ABSTRACT

A fluorescent lamp adapted for effecting stepless dimming with a regular SCR dimmer, comprising a filter and rectifier circuit (1), a DC high voltage stabilizing circuit (2), a voltage signal detection and frequency control circuit (6), a lamp load (4), a lamp current feedback circuit (5) and a voltage signal sampling circuit (3) thereby changing the power factor and luminous intensity of the lamp in accordance with the variation of the conduction phase angle of the silicon controlled rectifier dimmer. The present invention solves the discontinuity and instability issues in course of dimming operation and is particularly adapted for use in an integrated compact fluorescent lamp.

5 Claims, 1 Drawing Sheet

STEPLESS DIMMING FLUORESCENT LAMP AND BALLAST THEREOF

TECHNICAL FIELD

The present invention relates to a fluorescent lamp ballast capable of stepless dimming, and more particularly to a fluorescent lamp ballast adapted for enabling a fluorescent lamp and particularly a compact fluorescent lamp to effect dimming steplessly with a regular silicon controlled rectifier dimmer.

BACKGROUND OF THE INVENTION

A dimmable fluorescent lamp is desired by the public for a long time. Unlike an incandescence lamp which can effect dimming with a common silicon controlled rectifier (SCR) dimmer, a fluorescent lamp is a nonlinear load and exhibits a negative resistance characteristic such that it cannot effect dimming with the regular SCR dimmer. In the available domestic and commercial dimmers a TRIAC is usually employed, and a characteristic of which is the requirement of a holding current for maintaining the on state thereof after it has been triggered. The characteristic suits the operation modes of a resistive load such as an incandescence lamp so well but being undesired by a capacitive load such as a fluorescent lamp, for the reason that blinking might occur owing to the discontinuity and instability in course of dimming operation while such dimmers are employed, which in turns has an adverse effect on the illumination effect and the life span of the fluorescent lamp. In this way, the incandescence lamp having high power consumption and short lifespan is the only choice for those who want to use a dimmer to enjoy dimming function and effect.

SUMMARY OF THE INVENTION

An object of the present invention is to provide a novel fluorescent lamp ballast adapted for use with a SCR dimmer, and a fluorescent lamp and particularly a compact fluorescent lamp making use of the ballast, which is capable of effecting stepless dimming and providing a stable dimming effect.

Accordingly, a fluorescent lamp adapted for effecting stepless dimming with a regular silicon controlled rectifier dimmer is provided by the present invention, which comprises:

a filter and rectifier circuit;

a DC high voltage stabilizing circuit coupled with the filter and rectifier circuit;

a voltage signal detection and frequency control circuit coupled with the DC high voltage stabilizing circuit;

a lamp load coupled with the voltage signal detection and frequency control circuit; and a lamp current feedback circuit coupled between the lamp load and the voltage signal detection and frequency control circuit;

characterized in that it further comprises a voltage signal sampling circuit coupled between the filter and rectifier circuit and the voltage signal detection and frequency control circuit, which is configured to detect and convert a variation in conduction angle of the SCR dimmer, so as to correspondingly change output of the voltage signal detection and frequency control circuit or working current and power factor of the lamp load.

According to an embodiment of the present invention, the voltage signal sampling circuit comprises a plurality of first resistors in series connection, wherein one of the plurality of first resistors is respectively connected in parallel with a first capacitor, a first zener diode and a second resistor in series connection, a first diode and a third resistor in series connection, a second zener diode, a fourth resistor and a second capacitor in series connection; and a fifth resistor having its one end coupled with a junction point between the fourth resistor and the second capacitor; wherein the second capacitor is configured to provide a output voltage for the voltage signal sampling circuit.

According to an embodiment of the present invention, the DC high voltage stabilizing circuit comprises two serially connected diodes and a capacitor having its one end coupled with a junction point between the two serially connected diodes.

According to another embodiment of the present invention, the voltage signal detection and frequency control circuit comprises an integrated circuit block and various peripheral devices coupled correspondingly at respective pins of the integrated circuit block. Preferably, the integrated circuit block comprises a program by which output signal frequency of the integrated circuit block is altered correspondingly in response to a voltage value at a voltage signal detection pin of the integrated circuit block, thereby changing linearly the working frequency and luminous intensity of the lamp load. To be specific, the voltage signal sampling circuit provides a voltage variation signal generated by the SCR dimmer to the voltage signal detection pin of the integrated circuit block U1, and then the integrated circuit block U1 change correspondingly its output oscillation frequency in response to the level of voltage at the voltage signal detection pin, whereby changing the output power factor to regulate the output of the lamp load of the fluorescent lamp. According to the present invention, when the conduction angle of the SCR dimmer is changed from the maximum value to a specific value and then back to the maximum value from the specific value, it will be regarded as an operation cycle during which the lamp load will be correspondingly migrated from a working state of highest luminous intensity to a working state of relatively low luminous intensity and then back to the working state of the highest luminous intensity in a linear manner, whereby a linear stepless dimming of the fluorescent lamp is realized.

A fluorescent lamp according to the present invention can be adapted widely to replace the incandescence lamp having relative high power consumption and short lifespan in various locations where a SCR dimmer is installed for dimming effect, and which is more economical and favourable for environmental conservation as it employs only those electronic elements being compact in size and low in power consumption.

DETAILED DESCRIPTION OF THE PREFERRED EMBODIMENTS

Figure 1:
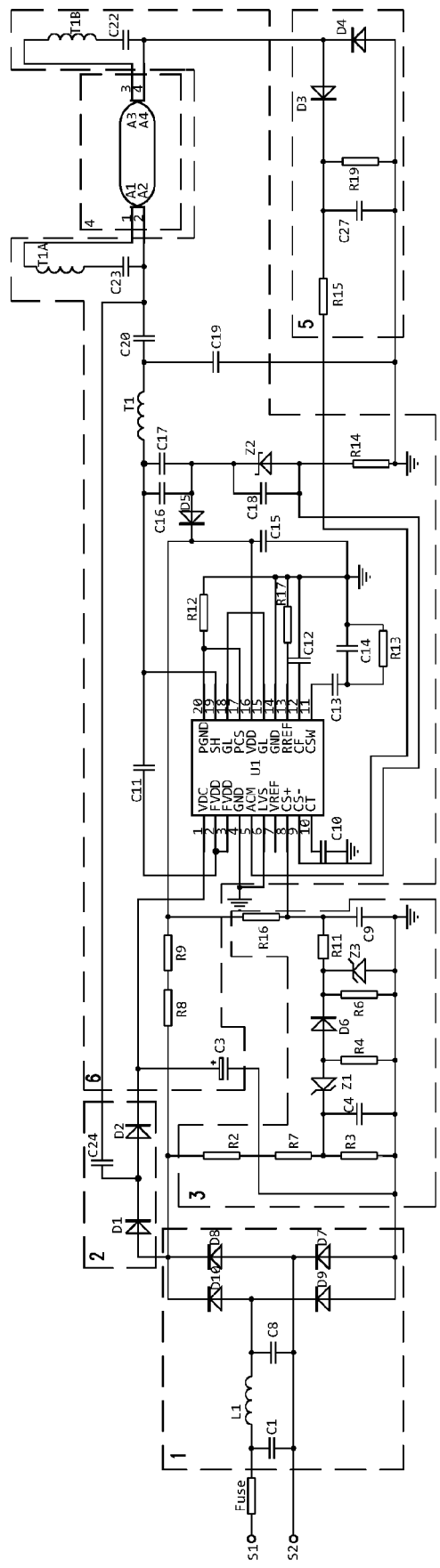
FIG. 1 is a circuit diagram of a fluorescent lamp capable of effecting stepless dimming with a regular silicon controlled rectifier dimmer and the ballast thereof.

Referring to FIG. 1, a fluorescent lamp capable of effecting stepless dimming with a regular silicon controlled rectifier dimmer in accordance with the present invention is illustrated, which comprises a filter and rectifier circuit 1, a DC high voltage stabilizing circuit 2, a voltage signal sampling circuit 3, a lamp load 4, a lamp current feedback circuit 5, and a voltage signal detection and frequency control circuit 6.

According to the embodiment, the filter and rectifier circuit 1 comprises a π filter circuit whereby filtering high frequency interference waves from coupled AC power source and converting AC input voltage into DC voltage.

The output end of the filter and rectifier circuit 1 couples with the input end of the DC high voltage stabilizing circuit 2 having its output end connected to the voltage signal detection and frequency control circuit 6 for supplying a stable DC high voltage to the integrated circuit block U1 of the voltage signal detection and frequency control circuit 6 thereof. The feedback end of the DC high voltage stabilizing circuit 2 is connected to the output end of the voltage signal detection and frequency control circuit 6 whereby feeding back the high frequency energy output thereof into a energy storage capacitor C3 of the DC high voltage stabilizing circuit 2. The DC high voltage stabilizing circuit 2 comprises two serially connected diodes D1, D2 and a capacitor C24 having its one end coupled with a junction point between the two serially connected diodes D1, D2 and its another end coupled with a capacitor C20 of the voltage signal detection and frequency control circuit 6 whereby to receive high frequency energy from a junction point in between the lamp load 4 and the capacitor C20, and the high frequency energy is fed into the energy storage capacitor C3 after being rectified by the diode D2.

The voltage signal sampling circuit 3 converts a variation in conduction phase angle of the SCR dimmer into a voltage signal and delivers such signal to a voltage detection pin CS+ of an integrated circuit block U1. The voltage signal sampling circuit 3 might comprise a plurality of resistors R2, R3, R4, R6, R7, R11, R16, capacitors C4, C9, a diode D6 and two zener diodes Z1, Z3; as shown in the FIGURE, the input end of which couples with the output end of the filter and rectifier circuit 1 while its output end being connected to the voltage detection pin (pin 8) CS+ of the integrated circuit block U1. The voltage at the output end of the filter and rectifier circuit 1 is stepped down via resistors R2, R7, and then it is divided through the resistor R3 and charges up the capacitor C4. A required phase angle signal for dimming can be sampled at capacitor C9 after the divided voltage pass through and being processed by C4, Z1, R4, D6, R6, Z3, R11, and R16; and the signal is then delivered to the voltage detection pin CS+ of the integrated circuit block U1.

As can be seen, the lamp current feedback circuit 5 comprises resistors R15, R19, a capacitor C27 and two diodes D3, D4.

The voltage signal detection and frequency control circuit 6 comprises the integrated circuit block U1 capable of controlling the working frequency and generating high frequency signals, and its associated peripheral devices, which consist of resistors, capacitors, diodes and zener diodes, being connected according to the requirements on the connection of the pins as stated in the specification of the integrated circuit block. The integrated circuit block U1 comprises the voltage signal detection pin CS+ coupled with the output end of the voltage signal sampling circuit 3, whereby the integrated circuit block U1 can change linearly the frequency of its output signal after a valid dimming phase angle signal is detected. After oscillation, the output signal enables the stable operation of the lamp load 4. In this way, when the frequency of output signal of the integrated circuit block U1 is altered, the working frequency and the luminous intensity of the lamp load 4 will be changed whereby the dimming operation is realized.

The voltage signal sampling circuit 3 and the voltage signal detection and frequency control circuit 6 according to the present invention make use of the inverse proportional relationship between the effective value of the DC pulse voltage obtained at sampling point and the conduction phase angle of the SCR dimmer, which means the output voltage of the voltage signal sampling circuit 3 will be correspondingly decreased/increased when the phase angle is increased/decreased. In this way, the working current or frequency of the lamp load 5 can be linearly altered to effect stepless dimming while the output frequency of U1 is increased/decreased along with the decrease/increase of the voltage at the voltage signal detection pin of the integrated circuit block U1.

Further, the DC high voltage stabilizing circuit 2 is employed to feed back the high frequency electric energy generated by the voltage signal detection and frequency control circuit 6 into the energy storage capacitor C3 for ensuring the DC high voltage will not drop dramatically during the frequency modulation of a specific range, thereby enabling the lamp load 4 to be operated in a more reliable and stable manner.

The foregoing voltage signal sampling circuit 3 and the voltage signal detection and frequency control circuit 6 as shown are designed specifically for effecting the stepless dimming of the fluorescent lamps, they might be complementary to each other or cooperate with other corresponding and functionally equivalent circuits such that a stable, linear and flicker-free stepless dimming can be effected with a SCR dimmer by setting an appropriate program and parameters thereof.

The voltage signal detection and frequency control circuit 6 of the present invention identifies mainly the conduction phase angles of the SCR dimmer and generates corresponding dimming control signals by making use of the integrated circuit block U1, thereby it is simple in configuration, stable in dimming performance and particularly adapted for use in a compact fluorescent lamp.

It should be understood that the above embodiment is merely an exemplary but not limitative example, while any other technical solutions obtained through logical analysis, deduction or limited experiments made by a person skilled in the art in accordance with the conception and teachings set forth hereinbefore shall all fall within the scope of the following claims of the present invention.

What is claimed is:

1. A fluorescent lamp ballast adapted for effecting stepless dimming with a regular SCR dimmer, comprising
   a filter and rectifier circuit (1);
   a DC high voltage stabilizing circuit (2) coupled with the filter and rectifier circuit (1);
   a voltage signal detection and frequency control circuit (6) coupled with the DC high voltage stabilizing circuit (2);
   a lamp load (4) coupled with the voltage signal detection and frequency control circuit (6); and
   a lamp current feedback circuit (5) coupled between the lamp load (4) and the voltage signal detection and frequency control circuit (6);
   characterized in that the fluorescent lamp ballast further comprises a voltage signal sampling circuit (3) coupled between the filter and rectifier circuit (1) and the voltage signal detection and frequency control circuit (6), which is configured to detect and convert a variation in phase conduction angle of the SCR dimmer, so as to correspondingly change output of the voltage signal detection and frequency control circuit (6) or working current and power factor of the lamp load (4).

2. The fluorescent lamp ballast as claimed in claim 1, wherein the voltage signal sampling circuit (3) comprises
- a plurality of first resistors (R2, R7, R3) in series connection, wherein the first resistor (R3) is respectively connected with
- a first capacitor (C4) in parallel,
- a first zener diode (Z1) and a second resistor (R4) in series,
- a first diode (D6) and a third resistor (R6) in series,
- a second zener diode (Z3) in parallel,
- a fourth resistor (R11) and a second capacitor (C9) in series; and
- a fifth resistor (R16) having its one end coupled with a junction point between the fourth resistor (R11) and the second capacitor (C9).

3. The fluorescent lamp ballast as claimed in claim 1, wherein the DC high voltage stabilizing circuit (2) comprises two serially connected diodes (D1, D2) and a capacitor (C24) having its one end coupled with a junction point between the two serially connected diodes (D1, D2).

4. The fluorescent lamp ballast as claimed in claim 1, wherein the voltage signal detection and frequency control circuit (6) comprises an integrated circuit block (U1) and peripheral devices coupled correspondingly at respective pins of the integrated circuit block.

5. The fluorescent lamp ballast as claimed in claim 4, wherein the integrated circuit block (U1) comprises a program by which output signal frequency of the integrated circuit block (U1) is changed correspondingly in response to a voltage value at a voltage signal detection pin of the integrated circuit block (U1).

\* \* \* \* \*